United States Patent
Donaldson

(10) Patent No.: US 10,953,534 B2
(45) Date of Patent: Mar. 23, 2021

(54) APPARATUS AND SYSTEM FOR MAGNETIC STABILIZATION OF HANDHELD POWER TOOLS

(71) Applicant: Trevor John Donaldson, Seeley's Bay (CA)

(72) Inventor: Trevor John Donaldson, Seeley's Bay (CA)

(*) Notice: Subject to any disclaimer, the term of this patent is extended or adjusted under 35 U.S.C. 154(b) by 107 days.

(21) Appl. No.: 16/022,929

(22) Filed: Jun. 29, 2018

(65) Prior Publication Data
US 2020/0001448 A1 Jan. 2, 2020

(51) Int. Cl.
| | | |
|---|---|---|
| *B25F 5/02* | (2006.01) | |
| *H01M 2/02* | (2006.01) | |
| *H02J 7/00* | (2006.01) | |
| *H01M 2/10* | (2006.01) | |
| *H01M 2/04* | (2006.01) | |

(52) U.S. Cl.
CPC ............ *B25F 5/02* (2013.01); *H01M 2/0202* (2013.01); *H01M 2/026* (2013.01); *H01M 2/0404* (2013.01); *H01M 2/0478* (2013.01); *H01M 2/1022* (2013.01); *H02J 7/0045* (2013.01)

(58) Field of Classification Search
CPC ....... B25F 5/02; H01M 2/026; H01M 2/0478; H01M 2/0404; H01M 2/0202; H01M 2/1022; H01M 2220/30; H02J 7/0045
USPC ........................................................ 429/163
See application file for complete search history.

(56) References Cited

U.S. PATENT DOCUMENTS

| | | | |
|---|---|---|---|
| 4,639,170 A | 1/1987 | Palm | |
| 5,174,690 A | 12/1992 | Targett et al. | |
| 5,275,514 A * | 1/1994 | Johnson | B23Q 3/1546 408/710 |
| 6,364,580 B1 | 4/2002 | Dils et al. | |
| 6,496,094 B2 | 12/2002 | May, III | |

(Continued)

FOREIGN PATENT DOCUMENTS

| | | |
|---|---|---|
| CA | 2690029 A1 | 7/2011 |
| CN | 201659546 U | 12/2010 |

OTHER PUBLICATIONS

Energizer LED Magnetic Flashlight—https://www.kmart.com/energizer-led-magnetic-pivot-flashlight-300-lumen-tactical/p-SPM8598966127I—downloaded from Kmart Website May 27, 2018.

(Continued)

*Primary Examiner* — Richard Isla
*Assistant Examiner* — Manuel Hernandez

(57) ABSTRACT

Handheld power tools are adapted for magnetic stabilization based on the incorporation of one or more permanent magnets in a base thereof. One or more permanent magnets may be incorporated into the base of a handheld power tool (or a detachable rechargeable battery base) such that when the base is contacted with an inclined steel roof panel, a magnetic force is applied that is sufficient to secure the handheld power tool in an upright and non-operational configuration. The distal region of the base may include a spacer formed from a compliant material to provide a spatial offset between the one or more permanent magnets and a surface with which the base is contacted. In some example embodiments, a rechargeable battery pack may include one or more permanent magnets that are capable of supporting the weight of an associated charger when the battery pack is contacted with a vertical steel surface.

20 Claims, 11 Drawing Sheets

(56) References Cited

U.S. PATENT DOCUMENTS

| | | | | |
|---|---|---|---|---|
| 6,888,940 B1* | 5/2005 | Deppen | ............... | B60R 11/0241 |
| | | | | 379/446 |
| 6,972,654 B1* | 12/2005 | Brock | ................... | B25B 11/002 |
| | | | | 335/285 |
| 7,431,251 B2* | 10/2008 | Carnevali | .............. | F16M 13/00 |
| | | | | 224/183 |
| 8,545,139 B2* | 10/2013 | Beichter | .............. | B25H 1/0071 |
| | | | | 318/39 |
| 9,242,367 B2* | 1/2016 | Timmons | ............. | B23Q 3/1546 |
| 9,561,568 B2* | 2/2017 | Brotto | ................... | B25H 1/0071 |
| 9,573,197 B1 | 2/2017 | Stephenson, Jr. | | |
| 9,630,286 B1* | 4/2017 | Pomerenke | .......... | F16M 11/041 |
| 10,315,256 B1* | 6/2019 | Stephenson, Jr. | ..... | B23B 45/003 |
| 10,583,539 B2* | 3/2020 | Timmons | ............. | B25H 1/0071 |
| 2007/0059114 A1 | 3/2007 | Grimes, II | | |
| 2009/0028653 A1* | 1/2009 | Wilbert | ................ | B25H 1/0071 |
| | | | | 408/76 |
| 2013/0108385 A1 | 5/2013 | Woelders | | |
| 2013/0112445 A1 | 5/2013 | Drako | | |
| 2014/0266000 A1* | 9/2014 | Meoli | ................. | H02J 2207/40 |
| | | | | 320/101 |
| 2020/0096155 A1* | 3/2020 | Georgeau | .................. | F16L 3/24 |

OTHER PUBLICATIONS

Taclight Product Image—http://www.asseenontvandbeyond.com/Bell-and-Howell-Tac-Light—As-Seen-On-TV-40x-Tac-Light-with-Magnetic-Base_p_347.html—downloaded May 27, 2018.

* cited by examiner

| | | | | | | | |
|---|---|---|---|---|---|---|---|
| 0 | 02-Jan | 0.5 | 12.7 | 320 | 20 | 9.072 | 97.65 | 215.28 |
| 0 | 15/32 | 0.46875 | 11.90625 | 300 | 18.75 | 8.505 | 91.55 | 201.82 |
| 0 | 16-Jul | 0.4375 | 11.1125 | 280 | 17.5 | 7.983 | 85.44 | 188.37 |
| 0 | 13/32 | 0.40625 | 10.31875 | 260 | 16.35 | 7.371 | 79.33 | 174.91 |
| 0 | 08-Mar | 0.375 | 9.525 | 240 | 15 | 6.804 | 73.24 | 161.46 |
| 0 | 11/32 | 0.34375 | 8.73125 | 220 | 13.75 | 6.237 | 67.13 | 148 |
| 0 | 16-May | 0.3125 | 7.9375 | 200 | 12.5 | 5.67 | 61.03 | 134.55 |
| 1 | 9/32 | 0.28125 | 7.14375 | 180 | 11.25 | 5.103 | 54.93 | 121.09 |
| 2 | 17/64 | 0.265625 | 6.746875 | 170 | 10.625 | 4.819 | 51.88 | 114.37 |
| 3 | 04-Jan | 0.25 | 6.35 | 160 | 10 | 4.536 | 48.82 | 107.64 |
| 4 | 15/64 | 0.234375 | 5.953125 | 150 | 9.375 | 4.252 | 45.77 | 100.91 |
| 5 | 7/32 | 0.21875 | 5.55625 | 140 | 8.75 | 3.969 | 42.72 | 94.18 |
| 6 | 13/64 | 0.203125 | 5.159375 | 130 | 8.125 | 3.685 | 39.67 | 87.45 |
| 7 | 16-Mar | 0.1875 | 4.7625 | 120 | 7.5 | 3.402 | 36.62 | 80.72 |
| 8 | 11/64 | 0.171875 | 4.365625 | 110 | 6.875 | 3.118 | 33.57 | 74 |
| 9 | 5/32 | 0.15625 | 3.96875 | 100 | 6.25 | 2.835 | 30.52 | 67.27 |
| 10 | 9/64 | 0.140625 | 3.571875 | 90 | 5.625 | 2.552 | 27.46 | 60.55 |
| 11 | 08-Jan | 0.125 | 3.175 | 80 | 5 | 2.268 | 24.41 | 53.82 |
| 12 | 7/64 | 0.109375 | 2.778125 | 70 | 4.375 | 1.984 | 21.36 | 47.09 |
| 13 | 3/32 | 0.09375 | 2.38125 | 60 | 3.75 | 1.701 | 18.31 | 40.36 |
| 14 | 5/64 | 0.078125 | 1.984375 | 50 | 3.125 | 1.417 | 15.26 | 33.64 |
| 15 | 9/128 | 0.0703125 | 1.7859375 | 45 | 2.8125 | 1.276 | 13.73 | 30.27 |
| 16 | 16-Jan | 0.0625 | 1.5875 | 40 | 2.5 | 1.134 | 12.21 | 26.91 |
| 17 | 9/160 | 0.05625 | 1.42875 | 36 | 2.25 | 1.021 | 10.99 | 24.22 |
| 18 | 20-Jan | 0.05 | 1.27 | 32 | 2 | 0.9072 | 9.765 | 21.53 |
| 19 | 7/160 | 0.04375 | 1.11125 | 28 | 1.75 | 0.7938 | 8.544 | 18.84 |
| 20 | 3/80 | 0.0375 | 0.9525 | 24 | 1.5 | 0.6804 | 7.324 | 16.15 |
| 21 | 11/320 | 0.034375 | 0.873125 | 22 | 1.375 | 0.6237 | 6.713 | 14.8 |
| 22 | 1/32 | 0.03125 | 0.79375 | 20 | 1.25 | 0.567 | 6.103 | 13.46 |
| 23 | 9/320 | 0.028125 | 0.714375 | 18 | 1.125 | 0.5103 | 5.493 | 12.11 |
| 24 | 1/40 | 0.025 | 0.635 | 16 | 1 | 0.4536 | 4.882 | 10.76 |
| 25 | 7/320 | 0.021875 | 0.555625 | 14 | 0.875 | 0.3969 | 4.272 | 9.42 |
| 26 | 3/160 | 0.01875 | 0.47625 | 12 | 0.75 | 0.3402 | 3.662 | 8.07 |
| 27 | 11/640 | 0.0171875 | 0.4365625 | 11 | 0.6875 | 0.3119 | 3.357 | 7.4 |
| 28 | 1/64 | 0.015625 | 0.396875 | 10 | 0.625 | 0.2835 | 3.052 | 6.73 |
| 29 | 9/640 | 0.0140625 | 0.3571875 | 9 | 0.5625 | 0.2551 | 2.746 | 6.05 |
| 30 | 1/80 | 0.0125 | 0.3175 | 8 | 0.5 | 0.2268 | 2.441 | 5.38 |
| 31 | 7/640 | 0.0109375 | 0.2778125 | 7 | 0.4375 | 0.1984 | 2.136 | 4.71 |
| 32 | 13/128 | 0.01015625 | 0.25796875 | 2006-01-02 | 0.40625 | 0.1843 | 1.983 | 4.37 |
| 33 | 3/320 | 0.009375 | 0.238125 | 6 | 0.375 | 0.1701 | 1.831 | 4.04 |
| 34 | 11/128 | 0.00859375 | 0.21828125 | Feb-51 | 0.34375 | 0.1559 | 1.678 | 3.7 |
| 35 | 5/640 | 0.0078125 | 0.1984375 | 5 | 0.3125 | 0.1417 | 1.526 | 3.36 |
| 36 | 9/1280 | 0.00703125 | 0.17859375 | Feb-41 | 0.28125 | 0.1276 | 1.373 | 3.03 |
| 37 | 17/2560 | 0.006640625 | 0.168671875 | Apr-41 | 0.265625 | 0.1205 | 1.297 | 2.87 |
| 38 | 1/160 | 0.00625 | 0.15875 | 4 | 0.25 | 0.1134 | 1.221 | 2.69 |

FIG. 8

APPARATUS AND SYSTEM FOR MAGNETIC STABILIZATION OF HANDHELD POWER TOOLS

BACKGROUND

Over the past decade, metal roofing has enjoyed an increase in popularity and adoption in both commercial and residential applications. Metal roofing provides many advantages over conventional asphalt shingle roofing, including higher strength, increased longevity, and improved resistance to hazards such as wind, snow, fire, mildew and insects, improved shedding of rain and snow, and recyclability. Metal roofing panels come in a variety of materials, including copper, aluminum and steel. Metal roofing panels can be painted and shaped to provide consumers with numerous different styles.

Galvanized steel is the most common form of steel roofing. The galvanization process involves the application of a layer of zinc, which protects the inner layer of steel from corrosion. The zinc layer is typically formed over a steel substrate (e.g. as per the ASTM A653 standard). Galvalume® steel is another type of steel roofing that uses a combination of aluminum and zinc for corrosion protection instead of zinc alone. The coating layer of Galvalume® steel is also formed over an underlying steel substrate (e.g. as per the ASTM A792 standard). The steel substrate for galvanized and Galvalume® is typically a carbon steel, such as type SS grade 33 or type SS grade 50 steel.

SUMMARY

Handheld power tools are adapted for magnetic stabilization based on the incorporation of one or more permanent magnets in a base thereof. One or more permanent magnets may be incorporated into the base of a handheld power tool (or a detachable rechargeable battery base) such that when the base is contacted with an inclined steel roof panel, a magnetic force is applied that is sufficient to secure the handheld power tool in an upright and non-operational configuration. The distal region of the base may include a spacer formed from a compliant material to provide a spatial offset between the one or more permanent magnets and a surface with which the base is contacted. In some example embodiments, a rechargeable battery pack may include one or more permanent magnets that are capable of supporting the weight of an associated charger when the battery pack is contacted with a vertical steel surface.

Accordingly, in a first aspect, there is provided a handheld power tool for use during installation of metal roofing, said handheld power tool comprising:
 a functional tool portion;
 a handle portion extending from said functional tool portion in a distalward direction; and
 a base connected to said handle portion for standing said handheld power tool in an upright and non-operational configuration when not in use;
 one or more permanent magnets secured to said base at a distal region thereof; and
 wherein said one or more permanent magnets are provided such that when a distal surface of said base is contacted with a surface of a type SS grade 33 steel roof panel having a thickness between 1.59 mm and 0.317 mm and an inclination of at least 10 degrees relative to a horizontal direction that is perpendicular to gravity, a magnetic force is applied between said base and the surface that is sufficient to secure and stabilize said handheld power tool in the upright and non-operational configuration relative to the surface of the steel roof panel; and
 wherein said base is configured to prevent scratching of the surface of the steel roof panel by the one or more permanent magnets when the base is secured to the steel roof panel.

In another aspect, there is provided a battery pack for use with a handheld power tool during installation of metal roofing, said battery pack comprising:
 a housing comprising a rechargeable battery, wherein said housing is configured to mechanically, electrically and removably engage with a distal region of a handle portion of the handheld power tool for the delivery of electrical power thereto, such that when said battery pack is attached to said handheld power tool, said battery pack forms a base that is suitable for standing said handheld power tool in an upright and non-operational configuration when not in use;
 one or more permanent magnets secured to said housing at a distal region thereof; and
 wherein said one or more permanent magnets are provided such that when said housing is engaged with the handheld power tool and a distal surface of said base is contacted with a surface of a type SS grade 33 steel roof panel having a thickness between 1.59 mm and 0.317 mm and an inclination of at least 10 degrees relative to a horizontal direction that is perpendicular to gravity, a magnetic force is applied between said base and the surface that is sufficient to secure and stabilize said handheld power tool in the upright and non-operational configuration relative to the surface of the steel roof panel; and
 wherein said base is configured to prevent scratching of the surface of the steel roof panel by the one or more permanent magnets when the base is secured to the steel roof panel.

In another aspect, there is provided a charging system for use with a handheld power tool, said charging system comprising:
 a battery pack comprising:
  a housing comprising a rechargeable battery, wherein said housing is configured to mechanically, electrically and removably engage with a distal region of a handle portion of the handheld power tool for the delivery of electrical power thereto;
  one or more permanent magnets secured to said housing at a distal region thereof; and
 a battery charger for charging said battery pack, wherein housing is further configured to mechanically, electrically and removably engage with said battery charger to receive electrical power therefrom, such that said distal region of said battery charger extends from said battery charger when said battery charger is engaged with said battery charger for charging;
 wherein said one or more permanent magnets are provided such that when a distal surface of said battery pack is contacted with a vertically oriented surface of a type SS grade 33 steel member having a thickness between 1.59 mm and 0.317 mm, a magnetic force is applied between said battery charger and the surface that is sufficient to secure said battery pack and said battery charger to the steel surface during charging.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 8 is a table providing a correspondence between gauge and thickness for various steel types.

DETAILED DESCRIPTION

Figure 1:
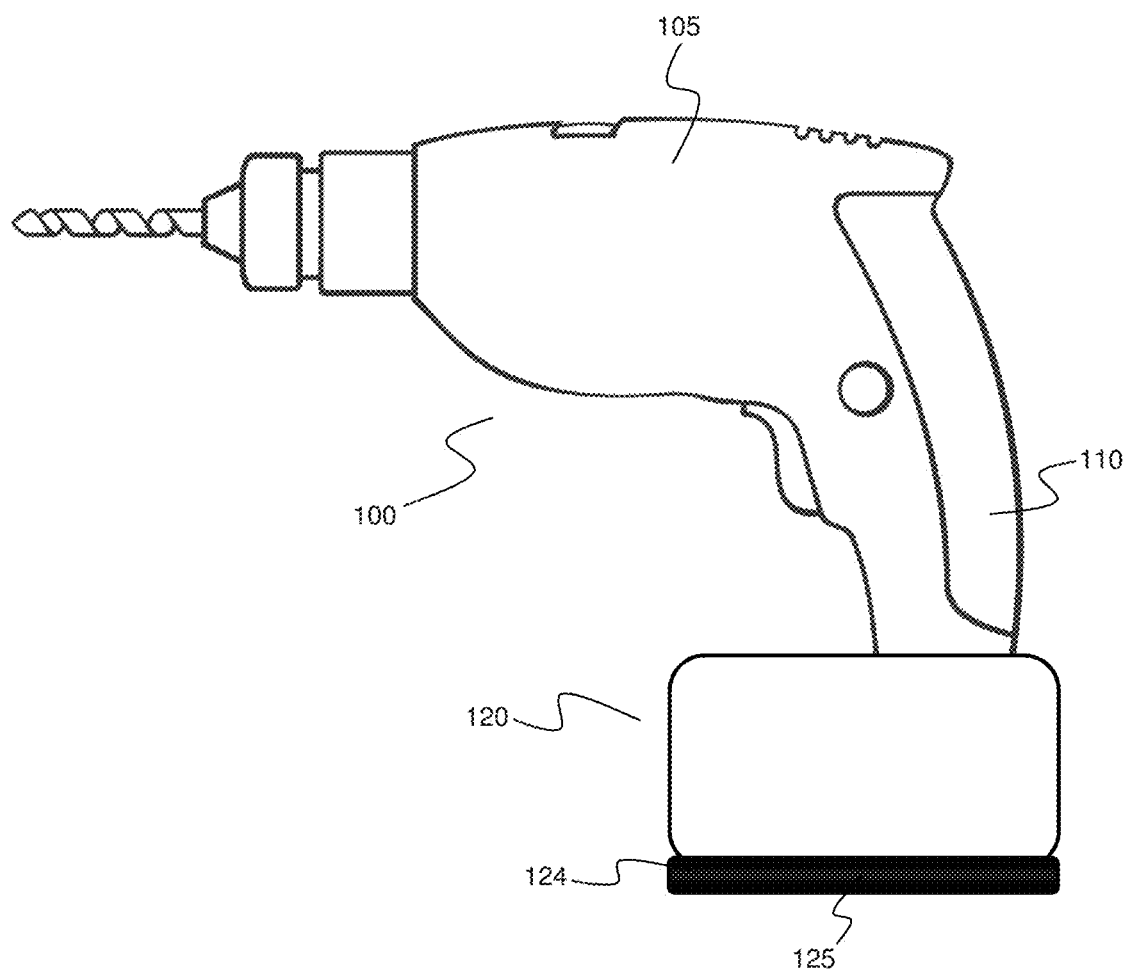
FIG. 1 shows an example of a handheld tool with a magnetic base for tool stabilization on an inclined steel roof.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

The present inventor found that when handheld power tools are employed during the installation of metal roofing, such tools presented a significant danger when not in use due to the risk of slippage and falling. Indeed, when a handheld power tool with a high center of gravity (as is the case with most handheld power tools) is rested on its base on an inclined steel surface, it is susceptible to tipping over under the gravitational torque that is present. Furthermore, unlike conventional asphalt shingle roofing that provides an inherent resistance to slippage due to its roughness, the smooth surface of metal roofing panels can easily lead to slippage of handheld tools. For example, when a worker rests a handheld power tool on the inclined surface of a metal roof in between use of the power tool, the power tool can easily tip over and slide down to roof surface, accelerating as it slides, and fall off the edge of the roof.

Such falling power tools present a significant risk of injury and can cause serious injuries or even death. For example, the impact from a handheld power drill falling from the edge of the roof of a multi-story building could easily lead to head injuries having high associated risk of morbidity or mortality. Falling power tools also present high risk of damage to underlying objects such as cars and outdoor furniture. Moreover, the impact from a fall will typically result in irreparable damage to the tool itself. It therefore follows that the risk of falling power tools presents significant harm, costs and associated liability.

The present inventor sought to address this problem by developing improved handheld power tools and associated components that reduce or eliminate the risk of falling tools for metal roofing applications. In particular, the present invention discovered, through experimentation, that most metal roofing panels employed in the metal roofing industry are formed with a base steel substrate that has ferromagnetic properties. This discovery was surprising to the inventor, as the product specification sheets for typical galvanized steel roofing panels are silent with regard to the possibility of magnetic properties.

Indeed, while it is generally known that many types of ferritic (non-austenitic) stainless steels having significant chromium concentrations can exhibit a body-centered cubic material composition that results in ferromagnetism, the magnetic properties of the carbon steel types conventionally employed in the metal roofing industry are not well-understood or well-characterized in the industrial or academic literature. In particular, while it is well-known that ferritic stainless steels often exhibit a relative magnetic permeability in the range of 1500-2000, the relative magnetic permeability of carbon steels employed in the production of steel-based roofing panels does not appear to be well-characterized and known in the art.

For example, when the present inventor inquired with the supplier (a large corporation known for providing a wide range of steel types) regarding the magnetic properties of galvanized steel roofing panels that had been supplied to the inventor, the vendor was unable to provide any technical information regarding the magnetic properties of the galvanized roofing steel panels. Instead, the inventor was only able to obtain elemental composition information, which, in the absence of parametric magnetic measurements or phase information associated with the underlying crystal structure of the steel, does not provide insight into the potential magnetic properties of the steel.

The present inventor determined, through experimental investigation, that the carbon-steel-based roofing panels typically employed in the roofing industry exhibit ferromagnetic properties. Realizing that such magnetism could potentially be employed for passive magnetic tool stabilization, the present inventor conducted further experiments to determine whether a handheld power tool could be adapted, through the addition of one or more permanent magnets, such that the handheld power tool could be magnetically secured to an inclined steel-based roofing panel when the handheld power tool was not in use.

Prior to performing such experiments, it was not clear whether or not the adaptation of a handheld power tool with permanent magnets would provide a sufficient magnetic interaction with steel-based roofing panels to facilitate passive tool stabilization on an inclined surface. This uncertainty in the feasibility of the presently claimed passive magnetic stabilization embodiments arose from two sources of uncertainty: (i) uncertainty regarding the sufficiency of the inherent magnetic properties of carbon-steel-based roofing panels (in other words, uncertainty regarding the magnitude of the relative magnetic permeability of carbon-steel-based roofing panels), and (ii) uncertainty regarding the sufficiency of the thickness of the steel substrate in carbon-steel-based roofing steel panels to provide the necessary magnetic force, especially if the thickness of the steel is insufficient to be saturated by the magnetic field generated by the permanent magnets.

The present inventor found, through experimentation with a handheld cordless power drill adapted to include permanent magnets, that a sufficient magnetic force could indeed be generated when the permanent magnets were mounted at the distal end of the base of the handheld power tool. For example, the example provided below, an example magnetically-adapted handheld cordless power drill is demonstrated as being capable of passive magnetic stabilization upon contact with a carbon-steel-based roofing panel of galvanized steel of type SS grade 33 with a thickness from 1.5875 mm (16 gauge) to 0.3175 mm (30 gauge) at various inclination angles exceeding 10°.

Referring now to FIG. 1, an example of a passively magnetically stabilized handheld power tool suitable for use during metal roofing is provided in the form of a handheld power drill 100. The handheld power tool 100 includes a functional tool portion (e.g. the longitudinal drill body in the present non-limiting example) 105, a handle portion 110 extending from the functional tool portion 105 in a distalward direction, and a base 120 that is connected to the handle portion 110. One or more of the tool portion 105, the handle portion 110 and the base 120 may be monolithically integrated. The base 120 is configured to support the handheld power tool 100 in an upright and non-operational configuration (shown in FIG. 1) when the handheld power tool 100 is not in use.

The handheld power tool 100 includes one or more permanent magnets (described in further detail below) that are provided at a distal region 122 of the base 120 such that when the distal surface 125 of the base is contacted a surface of a ferromagnetic material, a magnetic force is generated between the one or more permanent magnets and the ferromagnetic material.

Figure 2:
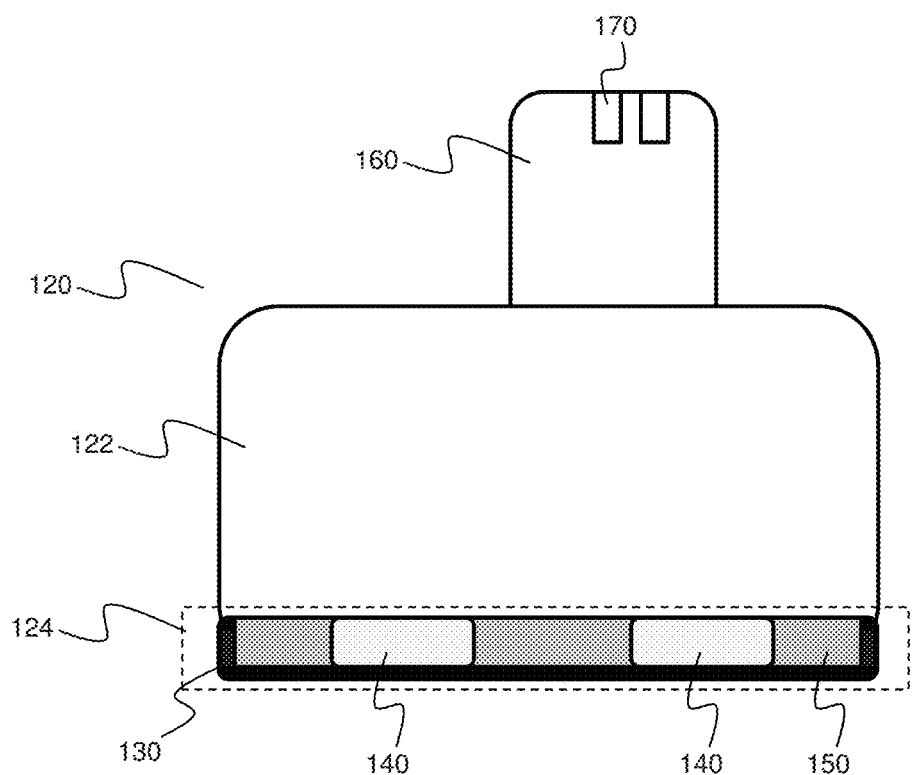
FIG. 2 shows an example of a battery pack having a distal magnetic portion that is configured for the stabilization of a handheld power tool on an inclined steel roof.

Referring now to FIG. 2, an example embodiment of a base 120 is shown, where the distal region 124 of the base 120 is shown in cross-section. In the present example embodiment, the base 120, when connected to the handle portion of the handheld power tool, supports the handheld power tool in an upright configuration and also provides a power source in the form of a rechargeable battery that resides within a housing 122. The base 120 is removably connectable with the handle portion of the handheld power tool via a connection member 160.

Connection between the base 120 and the handheld portion of the handheld power tool may be achieved according to a wide variety of attachment mechanisms, such as, but not limited to, mechanical latches, a threaded engagement, a pin, a friction fit, and a ball detent mechanism. The example base 120 includes electrodes 170 that are in electrical communication with the rechargeable battery. The electrodes 170 engage with corresponding electrodes in the handle portion of the handheld power tool (or alternatively electrodes of a battery charger). While the example embodiment of FIG. 2 illustrates an implementation in which the base 120 is detachable, it will be understood that in other example embodiments, the base may be permanently attached (e.g. integrated) with the remainder of the handheld power tool.

In FIG. 2, the distal region 124 is shown in cross-section, illustrating how the example base 120 includes permanent magnets 140 at the distal region 124 thereof. Although two permanent magnets 140 are shown, the base 120 may include one or more permanent magnets, provided that a sufficient magnetic force is provided to stabilize the handheld power tool on an inclined steel roof panel, as described in further detail below. In the example embodiment shown in FIG. 2, the permanent magnets 140 are housed within a distal magnet housing plate 130 that is secured to a distal end of the battery housing 122. The distal magnet housing plate 130 may be formed, for example, in a ferromagnetic material such as steel or in a non-ferromagnetic material such as plastic. The present example embodiment involving the use of a magnetic base that is connectable to the body of a handheld power tool may be beneficial in that it does not require the modification of the body of the handheld power tool, since the magnetic stabilization is performed by the battery pack as opposed to the body of the handheld power tool. Moreover, the battery pack may be configured to provide a magnetic force that is sufficient for the stabilization of a plurality of (e.g. all of, or a subset of) handheld power tools to which the battery pack is capable of interfacing.

In the example embodiment of FIG. 2, a mechanically compliant 130 material forms the distal surface of the base 120. Non-limiting examples of suitable compliant materials including elastomeric materials, such as rubber. While the compliant material 130 is shown in FIG. 2 as a layer that forms a coating over the entire distal surface, it will be understood that in other example implementations, the compliant material may be provided at one or more discrete regions of the distal end of the base 120. The compliant material 130 may be advantageously employed to avoid scratching of the steel surface when the distal surface of the base 120 is contacted with the steel surface. Furthermore, the compliant material 130 may also be beneficial in increasing the coefficient of static friction between the distal surface of the base 120 and the steel surface, thereby reducing the required normal force that is required to prevent slippage.

It will be understood that the embodiment shown in FIG. 2 is provided merely as a non-limiting illustrative example implementation involving the incorporation of one or more permanent magnets into the base of a handheld power tool. Additional example embodiments are described in further detail below.

Figure 3:
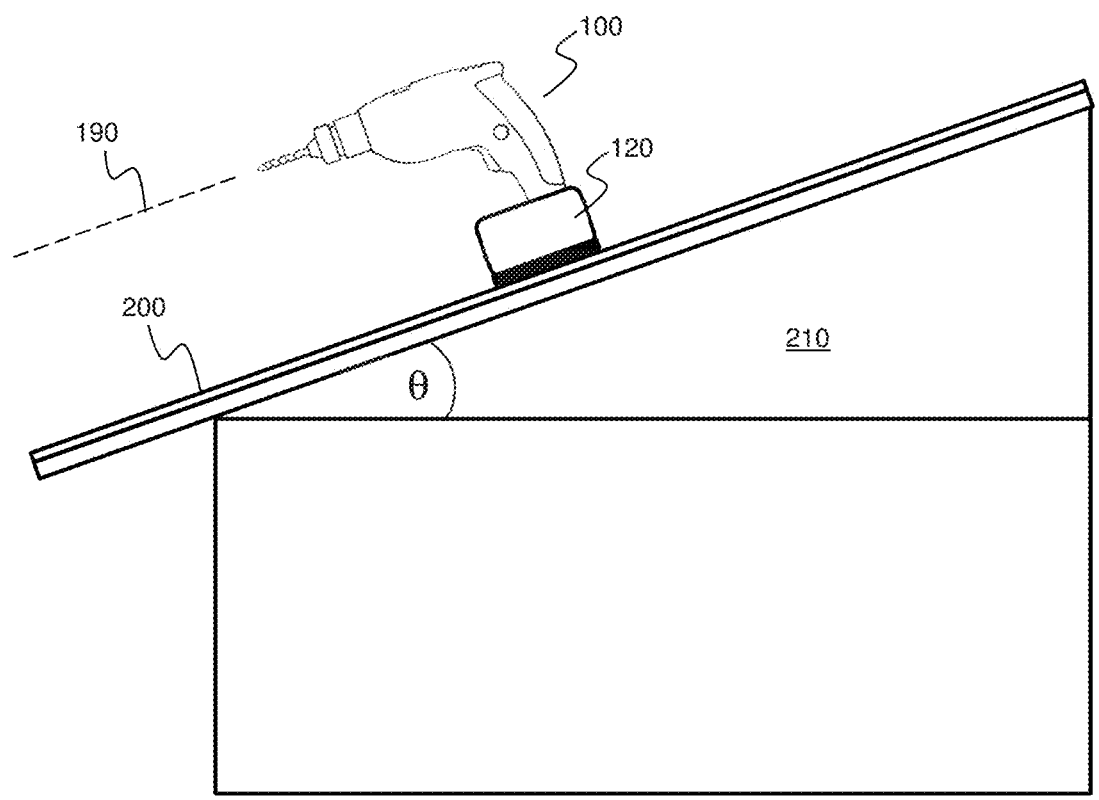
FIG. 3 shows an example of a handheld power tool having a magnetic base secured to an inclined steel roof when the handheld power tool is in its non-operational state.

Referring now to FIG. 3, the handheld power tool 100 is shown positioned, in its non-operational state, on the surface of a steel roofing panel having a surface 200 (installed on a building 210). A magnetic force is generated between the one or more permanent magnets residing in the distal region of the base 120, stabilizing the handheld power tool 100 relative to the gravitationally-induced tilt torque caused by the inclined surface 200, which is inclined at an angle θ. The magnetic force also increases the normal force produced at the roof surface, thereby increasing the static force of friction and reducing the likelihood of slippage.

The example embodiment shown in FIG. 3 therefore illustrates an example method of magnetically stabilizing a handheld power tool on an inclined steel roof during assembly and/or repair of a steel roof. When the handheld power tool 100 is in its non-operational state, the handheld power tool 100, adapted to include one or more permanent magnets at the distal region of its base 120, is placed on the surface 200 of the steel roof. The resulting magnetic force that is generated stabilizes the handheld power tool, reducing or eliminating the risk of tipping and slippage of the handheld power tool 100. While FIG. 3 shows the stabilization of the handheld power tool in an orientation in which its functional axis 190 is orientated in a downward direction, it will be understood that the magnetic force may be sufficient to stabilize the tool in any possible orientation of the handheld power tool when the surface of the base 120 is contacted with the surface 200 of the steel roof panel.

Unlike magnetic drills known in the art, which are configured to actively apply a magnetic force in a direction parallel to the drill axis 190 to a fixed (not handheld) drill, where the magnetic force is sufficiently strong to attach (i.e. clamp) the drill to the workpiece during operation of the drill, the present example embodiment provides a magnetic force that is sufficient to stabilize the handheld power tool in against gravitationally-induced tilt and slippage during its non-operational state, when the functional axis 190 of the handheld power tool 100 is oriented in a direction that is not parallel to the direction of the applied magnetic force. Indeed, in the example implementation shown in FIG. 3, the magnetic force is applied in a direction that is perpendicular to the direction associated with the functional axis 190 of the handheld power tool. Moreover, the magnetic force is passively applied such that the tool is removable from the surface of the steel roofing panel, as opposed to being actively clamped to a workpiece.

The magnetic force that is generated between the handheld power tool and the steel roofing panel is dependent on type and the thickness of the underlying steel substrate. The thickness of the carbon-steel-based panels employed in metal roofing is conventionally measured in gauge units. For example, in the case of galvanized and Galvalume® steel, the table shown in FIG. 8 provides a correspondence between gauge and thickness.

Accordingly, in various example embodiments in which the passively magnetically stabilized handheld power tool is adapted for stabilization on an inclined steel roof surface, the thickness of the underlying steel substrate may range between 1.5875 mm (16 gauge) and 0.3175 mm (30 gauge).

As described above, the carbon steel is conventionally employed for steel roofing panels (i.e. carbon steel with a protective layer formed, for example, via the galvanization or Galvalume® process). As different types of carbon steel (with variations in composition and/or crystal structure) will exhibit different magnetic properties, it will be understood that the strength (e.g. quantity, size and/or type) of the one or more permanent magnets that are needed to stabilize a handheld power tool (i.e. relative to gravity and/or slippage) for a given minimum inclination angle will depend on the type of steel substrate that is employed in the roofing panel.

In one example implementation, a commonly used type of steel, with a thickness satisfying the ranges provide above, may be employed as a reference to determine whether or not a given handheld power tool that includes one or more permanent magnets (or a detachable battery pack for use with a respective handheld power tool, where the detachable battery pack forms a base for the handheld power tool and includes one or more permanent magnets) provides a sufficient magnetic force to achieve stabilization. Two non-limiting examples of suitable types of steel are type SS grade 33 carbon steel and SS grade 50 carbon steel.

Accordingly, in one example embodiment, the one or more permanent magnets may be provided such that the handheld power tool is secured when contacted with a steel roofing panel formed from a steel substrate of type SS grade 33 steel, provided with a thickness of at least 0.3175 mm (30 gauge), and provided with an inclination, relative to the horizontal direction (perpendicular to gravity), of at least 10°.

In another example embodiment, a given magnetically-adapted handheld power tool or detachable battery pack may be determined to have a sufficient magnetic strength when the handheld power tool is stabilized when contacted with steel having selected minimum relative magnetic permeability. Accordingly, in one example embodiment, the one or more permanent magnets may be provided such that the handheld power tool is secured when contacted with a steel roofing panel formed from a steel substrate having a minimum relative permeability of at least 50, at least 60, and least 70, at least 80, at least 90, or at least 100, and provided with a thickness of at least 0.3175 mm (30 gauge), and provided with an inclination, relative to the horizontal direction (perpendicular to gravity), of at least 10°.

As the base 120 possess a sufficient magnetic field to achieve passive magnetic stabilization of the handheld power tool when the handheld power tool is placed in an upright configuration in a non-operational state on an inclined surface of a steel-based metal roof, it will be apparent that the base will be prone to attracting small ferromagnetic metal objects, such as small metal filings and small metal objects such as bits, washers and fasteners that exhibit ferromagnetism. If these objects are present when the base of the handheld power tool is contacted with the steel roof surface, they can lead to the scratching of the steel roof (e.g. scratching of a painted outer surface of a steel panel forming the steel roof). This problem can be mitigated by providing a storage container or sheath that encloses at least the distal portion of the base. In such an example embodiment, ferromagnetic objects that are attracted by the one or more permanent magnets are retained on the outer portion of the container or sheath and are removed when the container or sheath is withdrawn from the handheld power tool.

Figure 4A:
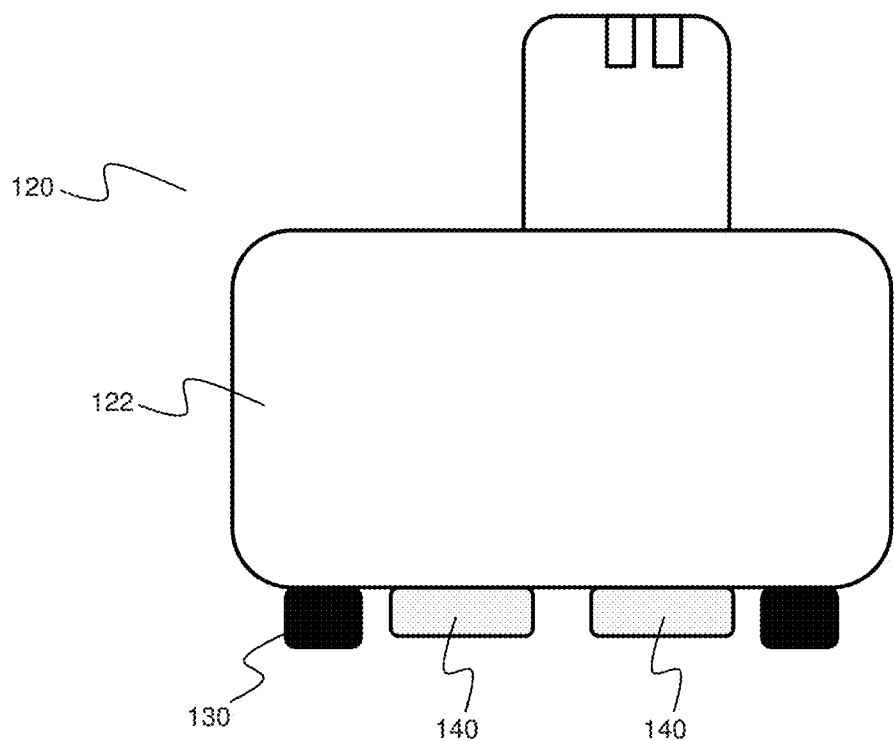
FIGS. 4A-4C show examples of an alternative battery packs configured for the stabilization of a handheld power tool on an inclined steel roof.
Figure 4B:
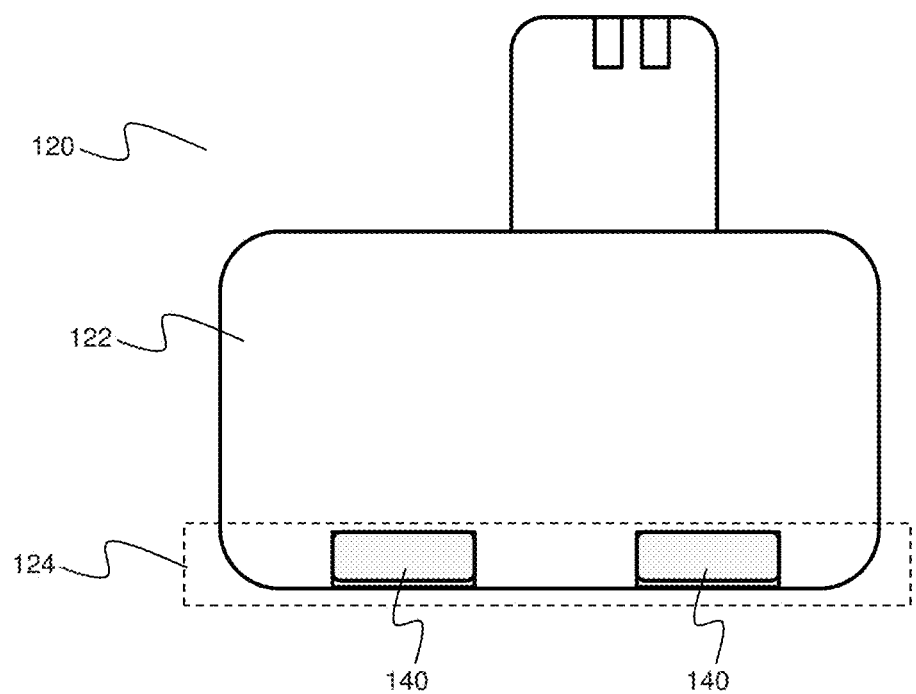
Figure 4C:
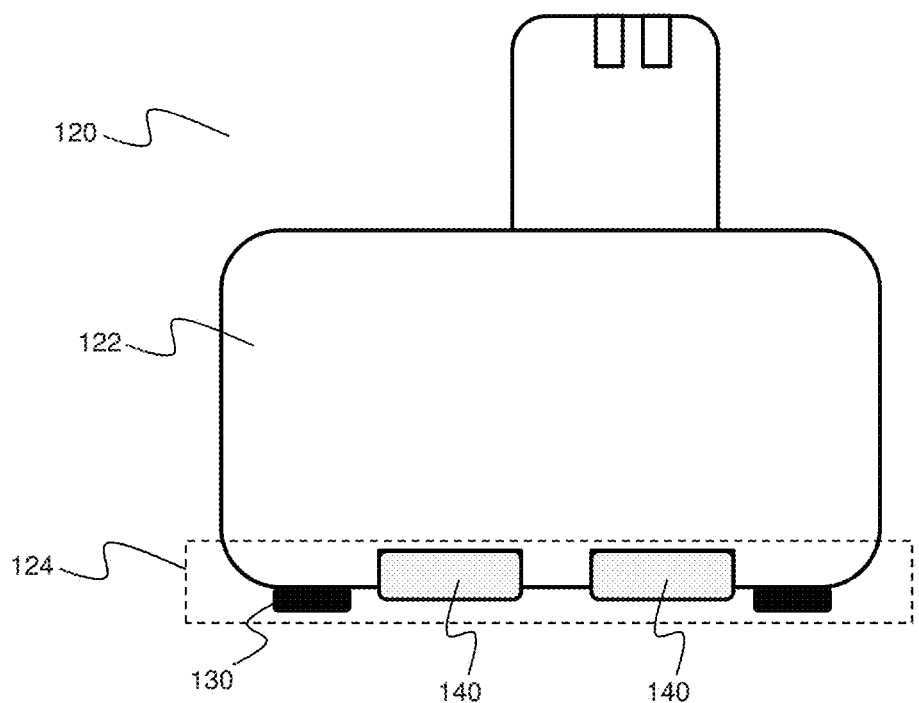

Referring now to FIGS. 4A-4C, additional non-limiting example embodiments of a passive magnetic base are shown for stabilizing a handheld power tool. In the example embodiment shown in FIG. 4A, one or more permanent magnets 140 are supported by the housing 122 (either directly attached to the housing, e.g. via an adhesive such as glue, or indirectly attached through attachment to an intermediate member or layer). One or more spacers 130 are provided to facilitate a gap between the distal surface of the permanent magnet(s) 140 and a metal surface upon which the base 120 is contacted to avoid direct contact between the one or more permanent magnets 140 and the metal surface. For example, the one or more spacers may include a single peripheral spacer that surrounds the one or more permanent magnets 140 or a plurality of discrete spacers. As described above, the one or more spacers 130 may be formed from a mechanically compliant (e.g. compressible) material, such as an elastomeric material.

FIG. 4B illustrates an alternative example embodiment in which the one or more permanent magnets 140 are recessed within the housing 122 (or alternatively recessed within a distal member that is itself attached to the housing 122) such that a distal gap exists between the distal surface of the one or more permanent magnets and a distal surface of the base 120. Although not shown, one or more spacers or a distal layer (e.g. coating) may be provided on the bottom surface of the housing 122. FIG. 4C illustrates yet another example embodiment in which the one or more permanent magnets 140 are partially recessed in the housing 122 (or alternatively partially recessed within a distal member that is itself attached to the housing 122). One or more spacers 130 are provided to facilitate a gap between the distal surface of the one or more permanent magnets 140 and the distal surface of the base 120.

In the example embodiment shown in FIG. 2 and the additional example embodiments illustrated in FIGS. 4A-C, the one or more permanent magnets 140 are provided such that a gap exists between the one or more permanent magnets 140 and a surface with which the base 120 is contacted. In the example embodiment shown in FIG. 2, the gap (spatial offset) is formed by the presence of the compliant layer 130. It will be understood that the strength of the magnetic force will be dependent on the thickness of the gap. In some example embodiments, the gap is less than 2 mm, less than 1 mm, or less than 0.5 mm.

Although many of the example embodiments described herein relate to the passive magnetic stabilization of a handheld power tool on an inclined surface of a steel roof, the present example apparatus may be adapted for the passive magnetic stabilization of a handheld power tool on the surfaces of vertically oriented steel members, such as the surface of steel framing studs, which, like steel roofing, are also typically formed from galvanized steel having carbon-steel substrate that exhibits magnetic properties.

Accordingly, in another example embodiments, the one or more permanent magnets may be provided such that the handheld power tool is secured when contacted with a steel member formed from a steel substrate of type SS grade 33 steel, provided with a thickness of at least 0.3175 mm (30 gauge), and provided with an inclination, relative to the horizontal direction (perpendicular to gravity), of approximately 90°. In another example embodiment, the one or more permanent magnets may be provided such that the handheld power tool is secured when contacted with a steel member formed from a steel substrate having a minimum relative permeability of at least 50, at least 60, and least 70, at least 80, at least 90, or at least 100, and provided with a thickness of at least 0.3175 mm (30 gauge), and provided with an inclination, relative to the horizontal direction (perpendicular to gravity), of at approximately 90°.

Figure 5A:
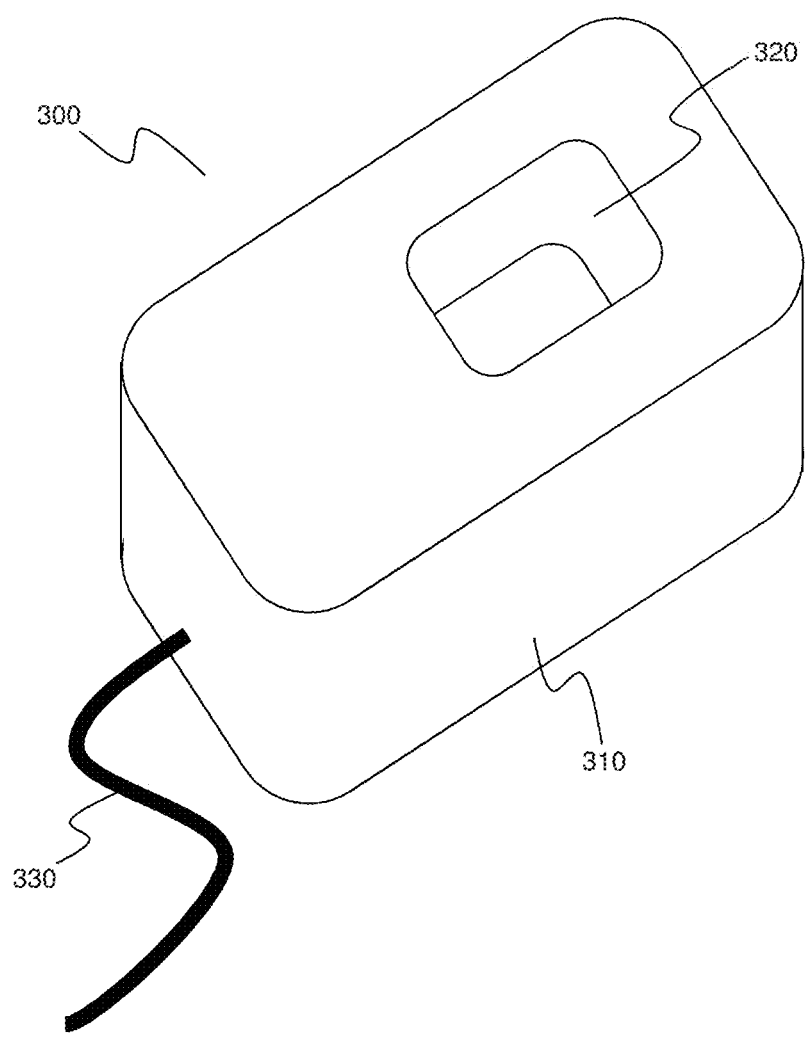
FIG. 5A shows an example charger for charging a rechargeable battery associated with a handheld power tool.

Referring now to FIG. 5A, a battery charger 300 for charging a rechargeable batter pack (such as the base 120 shown in FIGS. 2, 4A, 4B and 4C) is shown. The charger 300 includes a housing 310 that houses internal electrical circuitry for charging a rechargeable battery (e.g. an AC/DC converter) and includes a recess 320 suitable for interfacing with a battery pack. The recess 320 may include electrodes for electrically interfacing with electrodes of the battery pack (e.g. electrodes 170 of the battery pack shown in FIG. 2) and may also include a mechanical attachment mechanism for removably mechanically engaging with a battery pack (e.g. as per the example mechanisms described above). The charger can be plugged into to a power source via power cord 330. It will be understood that the example charger shown in FIG. 5A is but one example of a battery charger suitable for charging a rechargeable battery pack.

A significant problem that often exists at construction sites arises from the need to frequently recharge battery packs of handheld cordless power tools. Due to this need, it can be common for many battery chargers to be employed at the same time, often resulting in several battery chargers being plugged into a common outlet. Such a scenario can be problematic in that the battery chargers they can occupy a significant amount of space on the floor of the construction site. Moreover, the power cords of the battery chargers can present significant trip hazard.

Figure 5B:
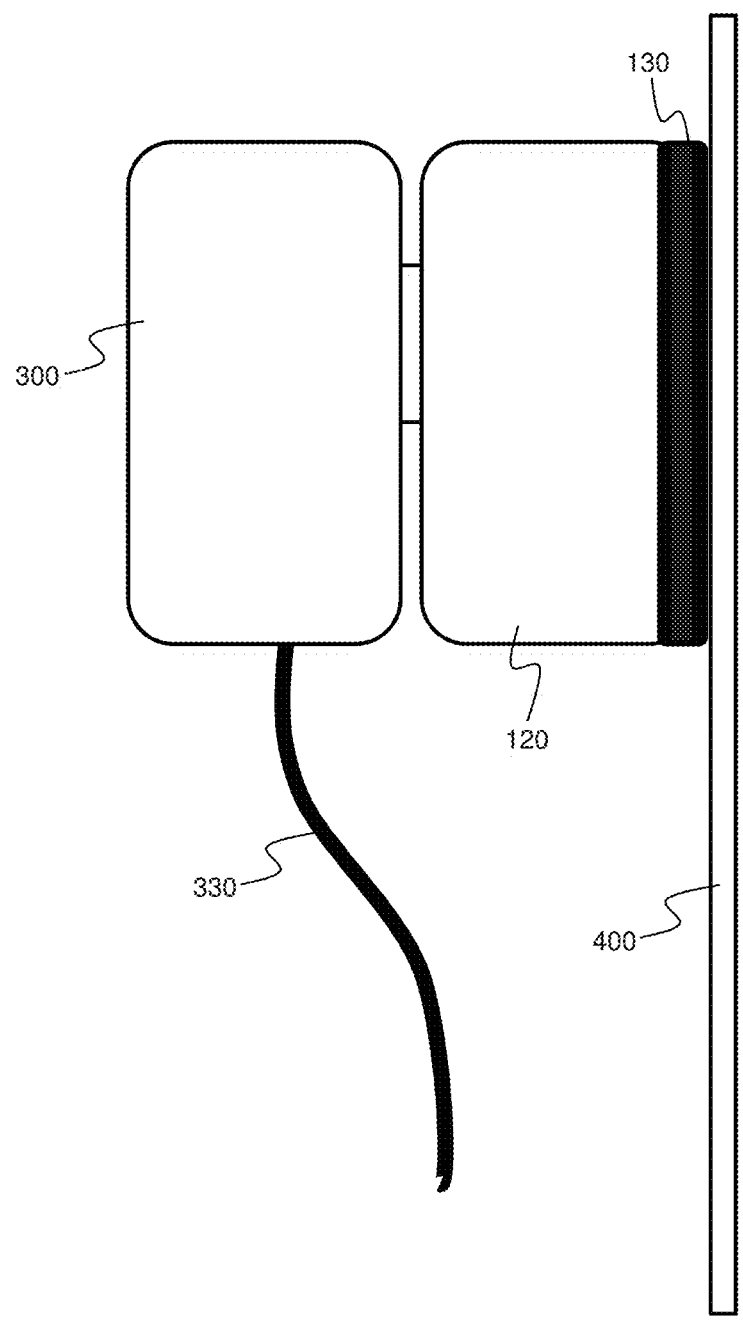
FIG. 5B illustrates the use of a battery pack having a distal magnetic portion configured to support a corresponding battery charger in a vertical orientation during charging of the battery pack.

As shown in FIG. 5B, in one example embodiment, this problem can be addressed by providing a battery pack (shown the figure as a battery pack 120 forming a base of a handheld power tool) that includes one or more permanent magnets at a distal region 124 thereof. Such a battery pack may be employed, optionally in addition to the aforementioned embodiments involving the passive magnetic stabilization of a handheld power tool, to secure a battery charger 300 relative to a vertically oriented steel member 400 (e.g. a steel stud) when the battery pack 120 is engaged therewith. According to the present example embodiment, the one or more permanent magnets of the battery pack are provided to stabilize and secure the battery pack and the battery charger in the illustrated vertical orientation. By securing a plurality of battery chargers relative to one or more vertical steel members, the battery chargers can be removed from the floor, avoiding the cluttering of the floor with multiple battery chargers. The securing of the battery chargers to vertical steel members may also be beneficial in reducing the risk of tripping on power cables of the battery chargers. This example embodiment may be beneficial in that it does not require the modification of an existing battery charger, since the magnetic stabilization is performed by the battery pack as opposed to the battery charger itself.

Accordingly, in one example embodiments, the one or more permanent magnets may be provided such that the battery charger 300 is supported when the battery pack 120 is mechanically engaged with the battery charger 300 and the base of the battery pack 124 is contacted with a steel member 400 formed from a steel substrate of type SS grade 33 steel, provided with a thickness of at least 0.3175 mm (30 gauge), and provided with an inclination, relative to the horizontal direction (perpendicular to gravity), of approximately 90°. In another example embodiment, the one or more permanent magnets may be provided such that battery charger 300 is supported when the battery pack 120 is mechanically engaged with the battery charger 300 and the base of the battery pack 124 is contacted with a steel member formed from a steel substrate having a minimum relative permeability of at least 50, at least 60, and least 70, at least 80, at least 90, or at least 100, and provided with a thickness of at least 0.3175 mm (30 gauge), and provided with an inclination, relative to the horizontal direction (perpendicular to gravity), of at approximately 90°.

While the preceding disclosure has provided a number of non-limiting examples of handheld cordless power drills having magnetic bases sufficient to provide passive magnetic stabilization, it will be understood that the embodiments described herein may be adapted for use with a wide variety of handheld power tools. Non-limiting examples of handheld power tools that may be adapted according to the embodiments described herein include portable power tools including, but not limited to: nail guns (air/gas powered), saws, drills, and battery chargers. Furthermore, while many of the examples provided herein relate to cordless handheld power tools, it will be understood that the embodiments disclosed herein may be adapted to corded handheld power tools.

EXAMPLES

The following examples are presented to enable those skilled in the art to understand and to practice embodiments of the present disclosure. They should not be considered as a limitation on the scope of the disclosure, but merely as being illustrative and representative thereof.

Figure 6A:
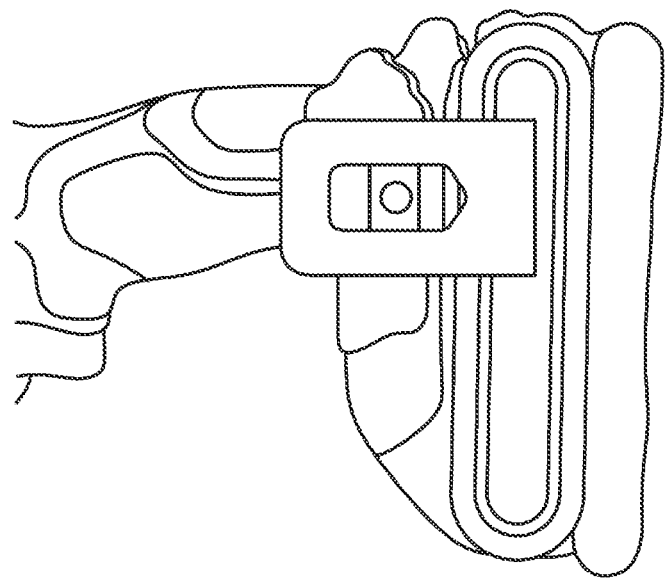
FIGS. 6A and 6B are photographs of an example handheld power tool having a rechargeable battery base with a distal magnetic portion.
Figure 6B:
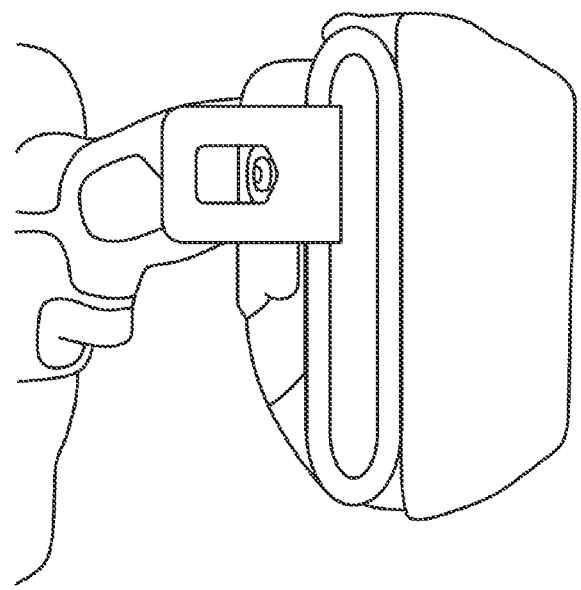

FIGS. 6A and 6B show photographs of an example handheld power tool that was adapted to provide magnetic stabilization according to the example embodiments discloses above. A Dewalt (3" by 4") 20 v cordless battery was adapted to include a set of permanent ceramic magnets at a distal region thereof. A 26 gauge steel plate having an upturned perimeter with a height of ⅜" was glued to the distal side of the battery pack. Six ceramic magnets, each with a ⅜" thickness, were glued to the central region of the plate. After curing the adhesive, the distal region of the battery pack was submerged liquid EPDM rubber, such that the EPDM coated the battery pack up to a height of ½" above the magnet and plate. The battery pack was then quickly removed and left to cure for 5 days. The EPDM coating step was subsequently repeated left to cure for 10 days prior to use. The resulting magnetically-adapted battery pack was found to provide stabilization of a cordless handheld power drill on a variety of steel surfaces.

Figure 7:
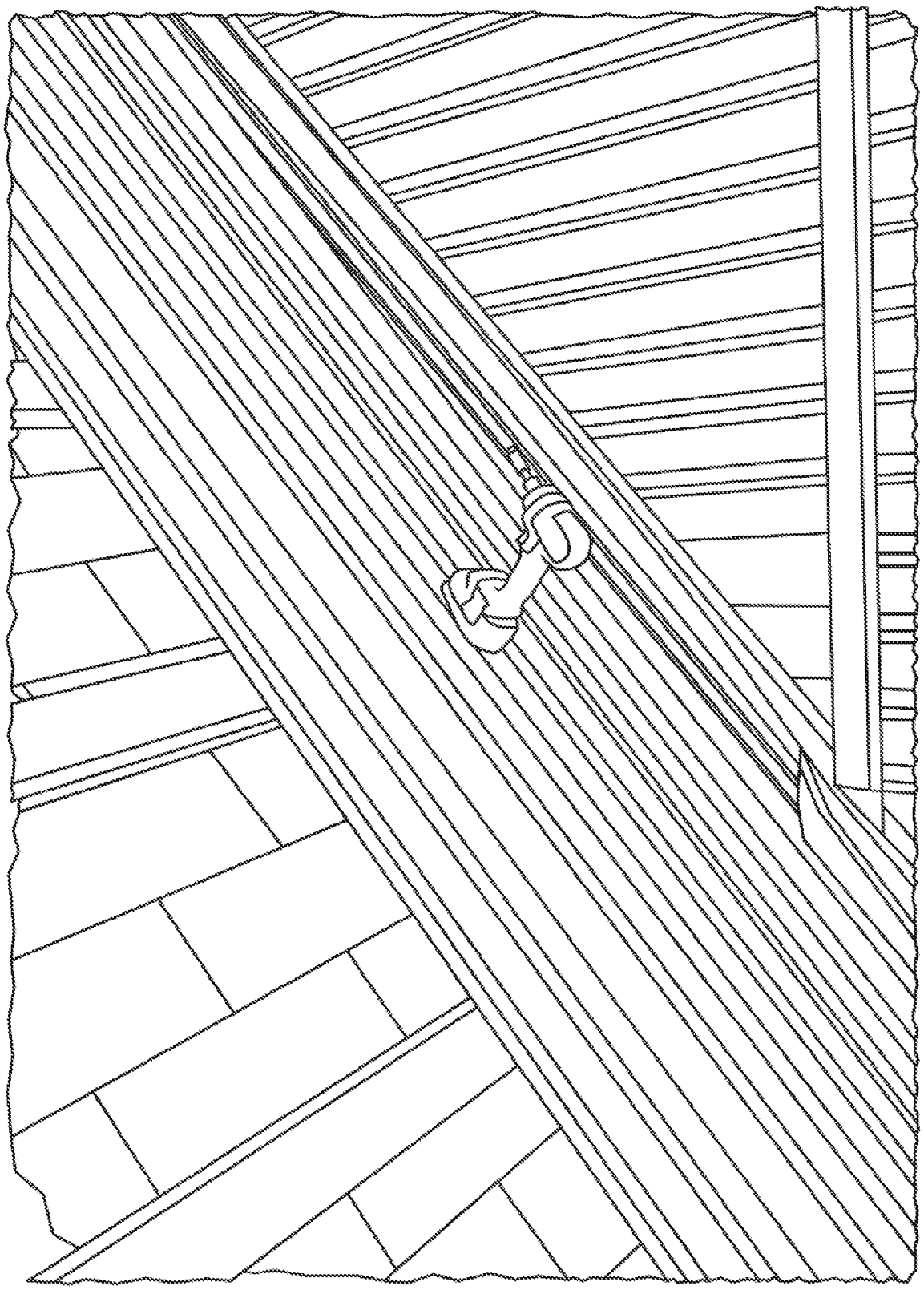
FIG. 7 is a photograph of an example handheld power tool having a rechargeable battery base with a distal magnetic portion, where the handheld power tool is shown secured to the surface of a steel roof via a magnetic force between the base of the power tool and the steel roof.

The use of the example handheld power tool in a steel roofing application is demonstrated in the photograph provided in FIG. 7, where the handheld power tool is shown secured to the surface of the steel roof for an inclination angle exceeding 45°.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A handheld power drill, said handheld power drill comprising:
    a functional drill portion having a drill axis, such that when a drill bit is installed on said handheld power drill, the drill bit extends along the drill axis;
    a handle portion extending from said functional drill portion in a distalward direction; and
    a base connected to said handle portion for standing said handheld power drill in a non-operational configuration when not in use, such that when said handheld power drill is positioned in the non-operational configuration by contacting said base with a surface, the drill axis is parallel to the surface;
    one or more permanent magnets secured to said base at a distal region thereof; and
    wherein said one or more permanent magnets are provided such that when a distal surface of said base is contacted with a surface of a type SS grade 33 steel member having a thickness between 1.59 mm and 0.317 mm and an inclination of at least 10 degrees relative to a horizontal direction that is perpendicular to gravity, a magnetic force is applied between said base and the surface that is sufficient to counteract a gravitational force and secure and stabilize said handheld power drill in the non-operational configuration relative to the surface of the steel member, thereby preventing the handheld power drill from falling.

2. The handheld power drill according to claim 1 further comprising a mechanically compliant material that forms a distal surface of said base to prevent scratching of the surface of the steel member.

3. The handheld power drill according to claim 2 wherein said mechanically compliant material is an elastomeric material.

4. The handheld power drill according to claim 2 wherein said one or more permanent magnets are secured to said base such that a gap of less than 1 mm is formed between at least one of said one or more permanent magnets and the surface of the steel member when the base is secured to the steel member.

5. The handheld power drill according to claim 1 further comprising a removable cover configured to cover at least a distal region of said base during storage, such that metal objects magnetically adhered to said cover during storage of said handheld power drill can be removed by removal of said cover.

6. The handheld power drill according to claim 1 wherein said base is configured such that when said handheld power drill is positioned in the non-operational configuration by contacting said base with the steel member, the magnetic force is applied in a direction that is not parallel to the drill axis.

7. The handheld power drill according to claim 6 wherein said base is configured such that when said handheld power drill is positioned in the non-operational configuration by contacting said base with the steel member, the magnetic force is applied in a direction that is perpendicular to the drill axis.

8. The handheld power drill according to claim 1 wherein said one or more permanent magnets are recessed within said base.

9. The handheld power drill according to claim 1 wherein said base comprises a removable rechargeable battery pack, and wherein said one or more permanent magnets are secured to a distal region of said removable rechargeable battery pack.

10. The handheld power drill according to claim 1 wherein said base is configured to prevent scratching of the surface of the steel roof panel by the one or more permanent magnets when the base is secured to the steel roof panel.

11. The handheld power drill according to claim 10 further comprising a mechanically compliant material that forms a distal surface of said base to prevent scratching of the surface of the steel roof panel.

12. The handheld power drill according to claim 11 wherein said mechanically compliant material is an elastomeric material.

13. The handheld power drill according to claim 11 wherein said one or more permanent magnets are secured to said housing such that a gap of less than 1 mm is formed between at least one of said one or more permanent magnets and the surface of the steel roof panel when the base is secured to the steel roof panel.

14. The handheld power drill according to claim 10 further comprising a removable cover configured to cover at least a distal region of said base during storage, such that metal objects magnetically adhered to said cover during storage of said battery pack can be removed by removal of said cover.

15. A charging system for use with a handheld power tool, said charging system comprising:
    a battery pack comprising:
        a housing comprising a rechargeable battery, wherein a proximal region of said housing is configured to mechanically, electrically and removably engage with a distal region of a handle portion of the handheld power tool for the delivery of electrical power thereto;
        one or more permanent magnets secured to said housing at a distal region thereof; and
    a battery charger for charging said battery pack, wherein said proximal region of said housing is further configured to mechanically, electrically and removably engage with said battery charger to receive electrical power therefrom;
    wherein said one or more permanent magnets are provided such that when a distal surface of said battery pack is contacted with a vertically oriented surface of a type SS grade 33 steel member having a thickness between 1.59 mm and 0.317 mm, a magnetic force is applied between said battery charger and the surface that is sufficient to counteract a gravitational force and secure said battery pack and said battery charger to the steel surface during charging, thereby preventing said battery pack and said battery charger from falling.

16. The charging system according to claim 15 wherein said distal surface of said battery pack is configured to prevent scratching of the surface of the steel member by the one or more permanent magnets when the base is secured to the steel member.

17. The charging system according to claim 16 further comprising a mechanically compliant material that forms a distal surface of said base to prevent scratching of the surface of the steel member.

18. The charging system according to claim 17 wherein said mechanically compliant material is an elastomeric material.

19. The charging system according to claim 17 wherein said one or more permanent magnets are secured to said base such that a gap of less than 1 mm is formed between at least one of said one or more permanent magnets and the surface of the steel member when the base is secured to the steel member.

20. The charging system according to claim 15 further comprising a removable cover configured to cover at least a distal region of said battery pack during storage, such that metal objects magnetically adhered to said cover during storage of said handheld power tool can be removed by removal of said cover.

* * * * *